UNITED STATES PATENT OFFICE.

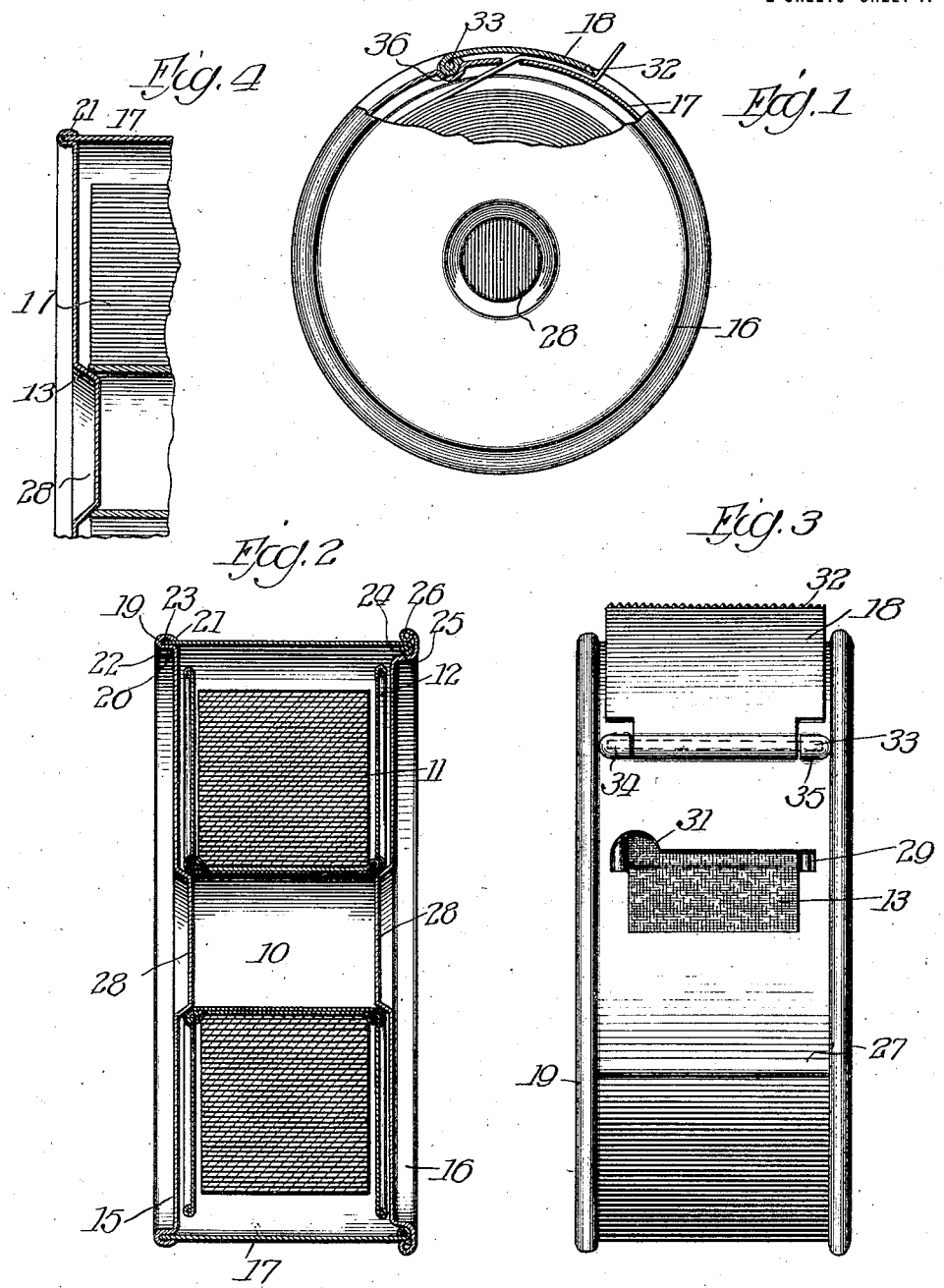

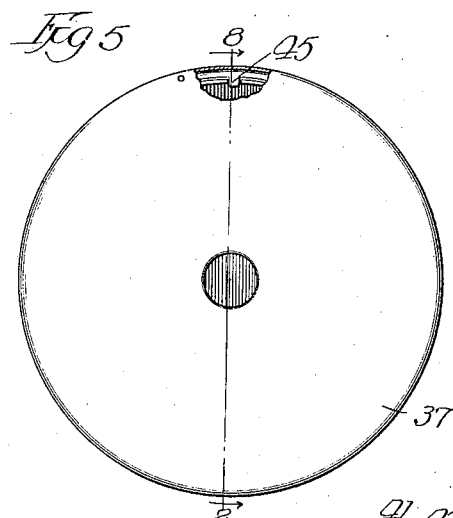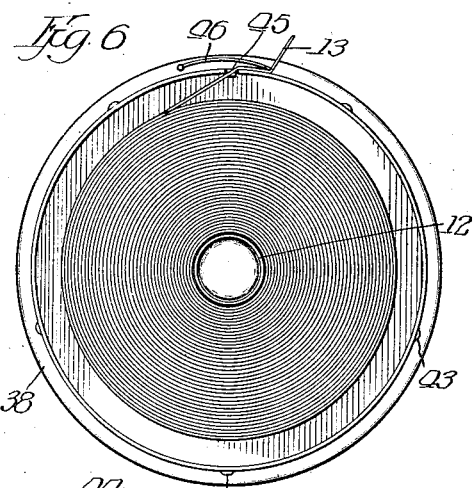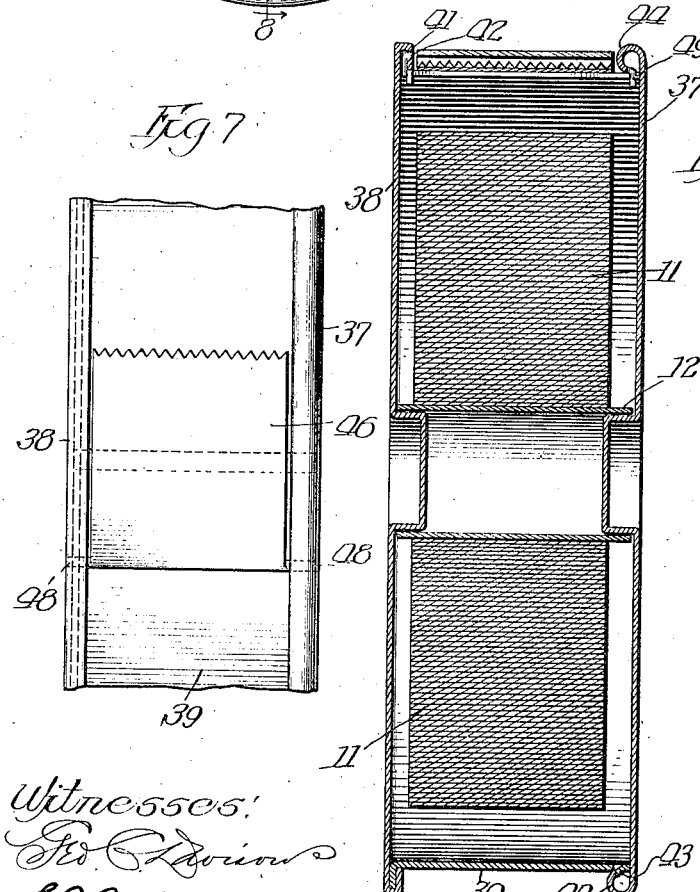

OTTO C. SCHULZ, OF CHICAGO, ILLINOIS, ASSIGNOR TO BAUER & BLACK, OF CHICAGO, ILLINOIS, A CORPORATION OF ILLINOIS.

PLASTER-SPOOL CONTAINER.

1,151,971.   Specification of Letters Patent.   Patented Aug. 31, 1915.

Application filed September 26, 1912. Serial No. 722,410.

*To all whom it may concern:*

Be it known that I, OTTO C. SCHULZ, a citizen of the United States, residing in Chicago, in the county of Cook and State of Illinois, have invented certain new and useful Improvements in Plaster-Spool Containers, of which the following is a specification.

My invention relates in general to receptacles or containers adapted to hold a reel or spool upon which material is wound in a continuous length and to permit desired amounts of this material to be readily withdrawn and cut off for use.

One of the principal objects of my invention is to provide a container of the general character described which will be particularly adapted to contain spools carrying adhesive bandages, so constructing and arranging the parts of the same that the spool carrying the bandage may be easily mounted in rotatable position therein and the material wound upon the spool easily and quickly withdrawn in desired amounts without necessitating the opening of the container and the consequent exposure of the bandage to the dust and dirt of the atmosphere.

A further object of the invention is to provide a container for an adhesive plaster bandage spool wherein a free end of the bandage will at all times be secured without the container, effective means being provided to prevent the free end accidentally falling into the container.

An additional object of the invention is to provide a container for an adhesive plaster spool which will be of simple construction and cheap to manufacture.

Additional objects of the invention will be apparent as the invention is better understood from the following description which, taken in connection with the accompanying drawings, illustrates two preferred embodiments thereof.

On the drawings, Figure 1 is a side elevation with parts broken away of a container made in pursuance of my invention; Fig. 2 is a transverse diametrical sectional view of the container shown in Fig. 1; Fig. 3 is a top plan view of the container shown in Fig. 1 with the cutter folded back to disclose the slot through which the bandage is withdrawn; Fig. 4 is a partial transverse sectional view similar to Fig. 2 showing a different form of plaster spool mounted in the container shown in Figs. 1, 2 and 3; Fig. 5 is a view similar to Fig. 1 showing a slightly modified form of container; Fig. 6 is a side elevation with one of the side walls of the container removed; Fig. 7 is a partial top plan view of the container shown in Fig. 5; Fig. 8 is a transverse sectional view taken on the diameter 8—8 of Fig. 5, and Fig. 9 is a perspective view of a cutter which may be employed in both the embodiments of the invention shown in the other views.

For the purpose of illustrating my invention I have shown the embodiments in connection with two forms of plaster spools, it being manifest, however, that a number of other varieties of spools or reels may be employed with equal efficiency. In Fig. 2 a spool is shown in section which is composed of a central hollow drum 10, upon which the bandage 11 is wound and to which are secured cylindrical side walls 12 of the well known commercial form, while in Figs. 4, 6 and 8 the spool is shown as being constituted of a single hollow cylindrical member 13 upon which the bandage strip is wound.

The container consists primarily of a pair of side walls 15 and 16 connected together about their peripheral edges with a sheet of suitable material 17 and a cutter 18 formed and arranged as follows. The side walls 16 and 17 are preferably circular in form and the sheet of material 17, preferably formed of suitable metallic material, is permanently interlocked with one side wall, *i. e.*, 15, and detachably engaged with the other, *i. e.*, 16. In the embodiment of the invention shown in Figs. 1 to 4 the peripheral edge of the side wall 15 is bent outwardly as at 20 and folded back upon itself as at 19 to provide the flange 21 and seat 22, between which is permanently clamped the adjoining edge 23 of the sheet 17. In this embodiment of the invention the detachable connection between the sheet 17 and the side wall 16 is produced by forming upon the edge of the sheet the bead 24 and upon the adjoining edge of the side wall the cylindrical seat 25 and the engaging bead 26 adapted to detachably clamp the bead 24 upon the seat 25. The connecting sheet 17 forming the cylindrical wall of the receptacle is shown in this embodiment of the invention as connected together at its ends by an interlocking fold 27.

The spool is preferably mounted to rotate about the center of the container, and to this end a cylindrical depression 28 is formed in each side wall concentrically therewith.

Extending transversely of the sheet 17 is provided a slot 29 slightly greater in length than the width of the bandage carried by the spool and of sufficient width to permit the easy removal of portions of the strip of material wound upon the spool. The rear wall of this slot in the direction of movement of the spool as it rotates when portions of the strip are withdrawn from the container is provided with an enlargement 31, through which the spool may be seen and the amount of bandage remaining readily determined. Normally covering this slot and pivotally mounted behind it is the cutter 18 having a suitable cutting edge which, in the embodiments of the invention herein described, is shown as formed of a plurality of sharp serrations 32. This cutter is preferably formed of a sheet of suitable metallic material curved as shown in Fig. 1 and having its rear edge bent to embrace a bearing pin or rod 33 which is secured at its ends 34 in stamped-up sockets 35, the material beneath the portion of the cutter embracing the rod being depressed as at 36 to co-act with the sockets 35 to pivotally retain the cutter in position.

In the embodiment of the invention shown in Figs. 5 to 9 somewhat different connections between the sheet 39 and the side walls 37 and 38 are provided. Upon this sheet at the edge adjacent the side wall 38 is formed an upwardly extending peripheral flange 41 which is embraced between the side wall and the inwardly extending flange 42 formed integrally with and spaced apart from the main portion of the side wall 38. The side wall 37 is connected with a sheet 39 in this embodiment by means of ears 43 struck up from the body of the sheet and a bead 44 spun into the form shown in Fig. 8, which engages these ears. In this embodiment of the invention the slot 45 is provided by constructing the sheet of a length slightly less than the circumferential dimension of the connecting wall, the ends of the said sheet being spaced apart by virtue of this difference of dimension as shown in Fig. 6. The cutter 46 may be connected to this sheet in the manner described in connection with the cutter 18, or it may be pivotally secured to the side walls by inserting the pivotal arms 47, which may be formed of a rod secured to the cutter, as previously described or may be made integral with the cutter, as shown in Fig. 9, in suitably formed apertures 48 in the portions of the side wall extending above the surface of the connecting wall. In order to maintain the slot 45 in proper relation to the cutter I provide upon one or both of the side walls at appropriate distance from the apertures 48 an inwardly extending tongue 49 which registers in the slots 45, preventing movement of the connecting sheet relatively to the side walls.

Although in showing and describing two embodiments of the invention a different form of cutter has been employed, and this cutter differently mounted therein, it will be obvious that either cutter may be used with either embodiment and mounted in either of the ways shown or other preferable manner without departing from the scope and spirit of the invention, or sacrificing any of its advantages. It will be apparent also that a cutter of either form mounted in either of the manners shown and described will normally overlie the slot through which the material 11 is being withdrawn, and in cutting off desired portions of the strip will force the free end down upon the outer surface of the sheet of material connecting the side walls, where it will adhere until more of the material wound upon the spool is desired, and in this way be effectively prevented from being drawn into the container where it may only be again positioned through the slot by removing the detachable side wall.

It is thought that the invention and many of its advantages will be understood from the foregoing, and it will be apparent that various changes may be made in the form and arrangement of the parts without departing from the spirit or scope of the invention, or sacrificing any of its advantages, the forms hereinbefore disclosed being merely preferred embodiments thereof.

I claim:—

In an adhesive plaster container, the combination of a casing comprising a cylindrical portion and separate end portions one of said end portions being fixedly and the other detachably connected thereto and both extending a substantial distance beyond the periphery of said cylindrical portion, integral inwardly disposed bosses at the centers of said end portions, a spool within said casing journaled on said bosses, a slot in said cylindrical portion through which the end of a roll of adhesive plaster carried by said spool may protrude, and a cutter pivotally mounted adjacent and adapted to overlie said slot when in operative position.

OTTO C. SCHULZ.

Witnesses:
  IRA J. WILSON,
  J. C. CARPENTER.